Feb. 28, 1939.    W. W. BURKE    2,148,530
DAMPER
Filed May 2, 1938
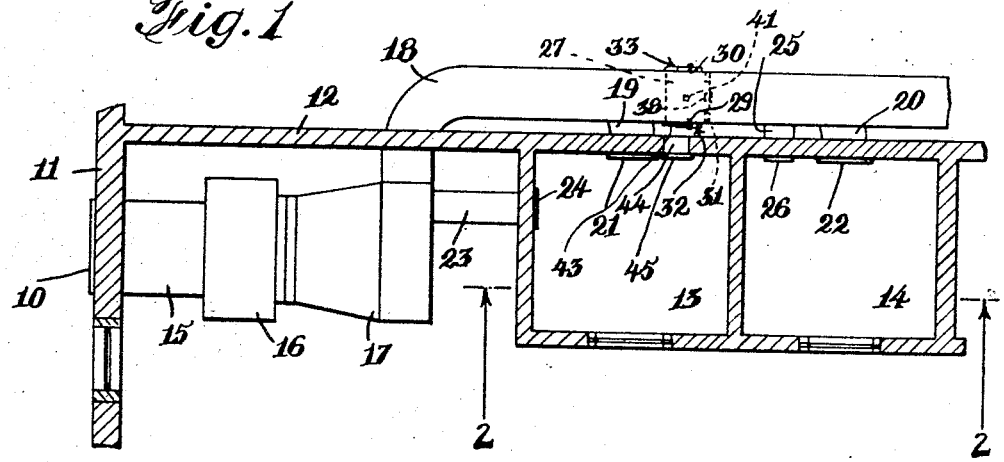
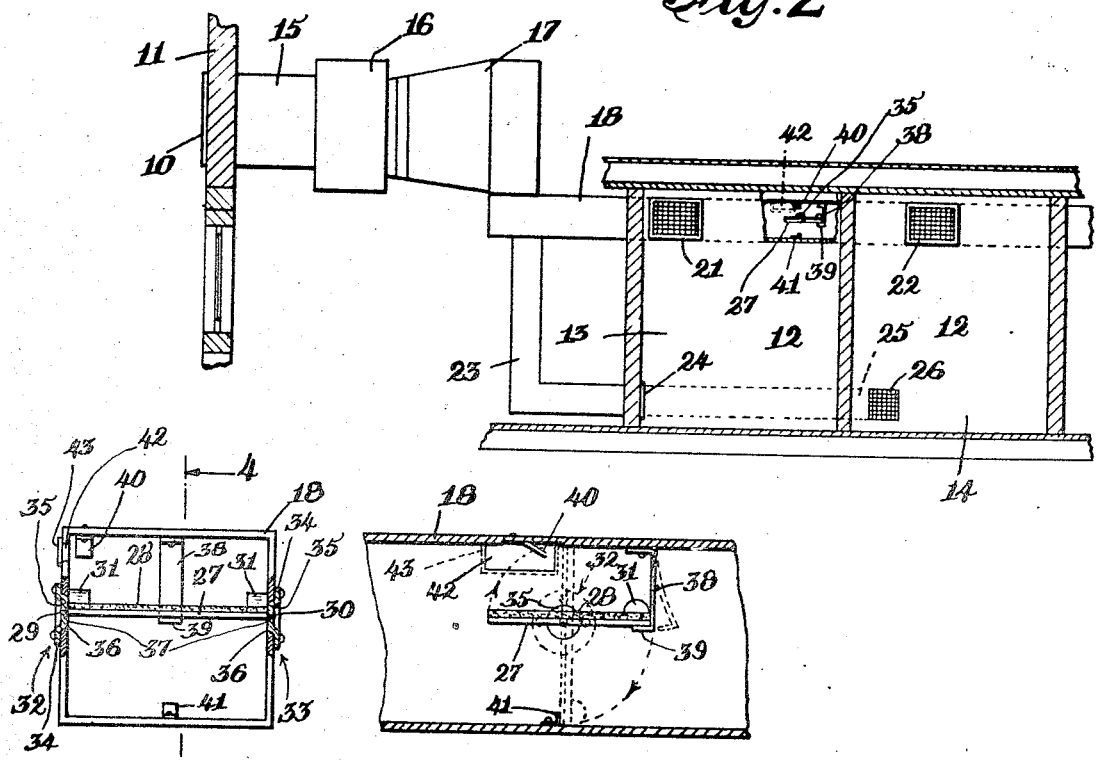
WILLIAM WALLACE BURKE
INVENTOR.
BY *Alexander Blercher*
ATTORNEY.

Patented Feb. 28, 1939

2,148,530

UNITED STATES PATENT OFFICE 2,148,530

DAMPER

William Wallace Burke, Manchester, N. H.

Application May 2, 1938, Serial No. 205,660

7 Claims. (Cl. 98—33)

This invention relates generally to dampers for air conditioning systems, but more particularly to heat controlled dampers adapted to be installed in either or both inlet and return ducts whereby the dampers automatically close the cross-sectional area in said ducts when encountering heat of a predetermined temperature.

The main object of the invention resides in the provision of a damper construction adapted to be installed either singly or at intervals in the ducts of an air conditioning system whereby the damper automatically closes the duct passage in case of fire to prevent the spread of flames from one room to another.

The invention further contemplates a damper construction which is automatically releasable from a normal open position to the air-flow within the duct to a closed position, the closing or locking of the damper within the duct being controlled by hot gases or flames emanating from the outside of the building and entering the air inlet of the system or by heat resulting from a fire adjacent to a portion of the duct containing the damper.

Another object of the invention resides in the provision of a fire damper which is simple in construction, efficient in operation, economical to manufacture and install and easily accessible for resetting purposes.

These objects and other ends and advantages of the invention will hereinafter appear in the progress of the disclosure and as pointed out in the appended claims.

Accompanying this specification is a drawing showing a preferred embodiment of the invention as applied to a conventional air-conditioning system, in which drawing corresponding reference characters designate corresponding parts throughout the several views and wherein:

Figure 1 is a diagrammatic top plan view of part of an air conditioning system as applied to the rooms and walls of a building, the rooms and walls being shown in section, and a damper being shown mounted in a duct portion.

Figure 2 is a sectional view of Figure 1 along the plane 2—2 thereof.

Figure 3 is an end view in elevation of a portion of a duct showing the improved damper in open position therein.

Figure 4 is a sectional view of Figure 3 through the plane 4—4 thereof.

In accordance with the invention and the preferred form thereof shown in the accompanying drawing, the improved damper is applicable to any air conditioning system which utilizes an inlet duct system either alone or in conjunction with a return duct system and also to unit air conditioners, but in the latter case, the dampers would be mounted in air-flow ducts connecting the interior of adjacent rooms. However, the damper is illustrated as being applied to the conventional air conditioning system which has both an inlet and return duct system, the ducts being shown as concealed between the walls of the rooms.

In the air conditioning system shown in Figures 1 and 2, an air inlet 10 is diagrammatically shown on the exposed portion of a building wall 11, an interior rear wall 12 and interior walls forming adjacent rooms 13 and 14 being shown to illustrate the system as applied to a portion of the building. An intake duct 15 communicating with the air inlet 10 proceeds to join the conditioner compartment diagrammatically represented by numeral 16, the said conditioner having means therein for air washing, cooling and humidifying, while the distributor duct diagrammatically represented by numeral 17 contains a fan which delivers the conditioned air to the inlet duct 18. Branches 19 and 20 proceed from the inlet duct to rooms 13 and 14 respectively and terminate in registers 21 and 22. Grilles 24 and 26 in rooms 13 and 14 communicate with branches 23 and 25 of a return duct system.

If a fire or hot gases of combustion were present externally of the building wall 11 and near air inlet 10, heat in the form of flames or hot gases would be forced through inlet duct 18 and cause the spread of fire from one room to another. Moreover, if any portion of inlet duct 18 were exposed to a fire such as in room 13, the heat would be circulated into room 14 and thereby cause the spread of flames.

The invention, therefore, contemplates the provision of an improved damper which is inserted at intervals along the intake duct 15 whereby each damper is automatically locked at those intervals of the duct which are adjacent to the source of heat or flames thereby cutting off the flow of conditioned air to other parts of the system. The return duct system also is provided with the mounting of similar dampers to avoid the furnishing of a draft to fan the flames in the event that a fire starts within distance of a branch thereof.

As shown in the figures, a single improved damper is mounted within a section of intake duct 18 proximate to room 13, it having been deemed unnecessary to duplicate the showing of dampers at intervals along either the intake or return ducts. Moreover, the improved damper is shown as being mounted in a horizontally disposed duct, but it is understood that the damper may also be mounted in a duct which is either vertical or inclined, the same principles of operation and construction being utilized.

Specifically, the improved damper comprises a conventional damper plate 27 preferably having associated therewith a fireproof surface 28 such as asbestos, the said surface being on the side which meets the air-flow when the damper is closed. Plate 27 is provided with an axis such as one formed by end pins 29 and 30, the said axis being preferably eccentric to the imaginary central axis of the plate as shown in Figure 4. In addition, the damper plate 27 is preferably weighted in any manner on one side to cause an easy gravity controlled fall of the plate into closing position as will hereinafter appear. As shown, the weighting comprises a pair of heavy lugs 31 situated along the corners of the plate on the overbalanced side of the axis thereof. The pins 29 and 30 are mounted on opposite walls of a section of intake duct 18 in any known manner such as within sockets 32 and 33, the said sockets 32 and 33 serving as bearings for the said pins. The sockets are preferably comprised of collars 34 having depressed central portions 35, the said central portions 35 registering with orifices 36 along the side walls of the duct. Centrally of the depressed portions of collars 34 are orifices 37 which engage pins 29 and 30. The collars 34 are secured externally of the side walls of a section of intake duct 18 by any known means such as rivets.

Since the plate 27 is pivotally mounted off the center of gravity thereof within a section of the intake duct 18, gravity would ordinarily cause the said plate to fall through at least an angle of 90 degrees in the direction of the arrows shown in Figure 4. To maintain the open position of the damper as shown in Figure 4, a heat controlled support is provided therefor. By way of example, a bi-metallic standard 38 depends from the upper wall of a section of the intake duct 18, the said standard terminating in an inwardly disposed bracket 39, the said bracket 39 serving as a support for the heavier side of damper plate 27 in open position. A high temperature reaching standard 38 will cause bracket 39 to deflect from its supporting position thereby releasing the support of damper 27. When this occurs, the plate 27 will revolve by the action of gravity toward a closed position relative to the interior area of a section of the intake duct 18. To prevent the plate from exceeding a 90 degree displacement by virtue of its momentum, and to lock the same in place when such displacement has occurred, a suitable latch and stop member are provided. Thus a latch in the form of a spring clip 40 is secured to the upper wall of a section of the intake duct 18 and will prevent turning of the damper plate back toward its original position within the duct while a stop 41 on the lower wall will prevent rotation of the plate in excess of 90 degrees. The momentum of the swinging damper plate 27 will be sufficient to clear the spring clip 40, but the return momentum of the damper plate will be insufficient to clear the said spring clip.

After the damper plate has attained its closed position, it becomes necessary to reset the same in open position within the duct. For this purpose, an opening 42 and cover therefor 43 are provided on the side wall of the duct whereby an operator may put his hand within the duct 18 to reset the damper plate in open position. The resetting of the damper plate merely involves freeing the same outwardly from spring clip 40 and setting bracket 39 under the heavier side of plate 27.

Where the ducts are in concealed positions, as shown in Figures 1 and 2, it is necessary to provide the wall or ceiling with an opening 44 having a cover 45 in order to make accessible the opening 42 into the intake duct 18.

I wish it understood that minor changes and variations in the material, location, relative positions, and integration of the several parts may all be resorted to without departing from the spirit of the invention and without departing from the scope of the appended claims.

I claim:

1. In combination with a duct, an off-balanced gravity acting damper pivoted within said duct, heat controlled and resettable supporting means mounted on an inner wall of the duct and being adapted to releasably support the damper therewithin in open position, and stopping members mounted within the duct to lock the damper in fallen closed position when released one of said stopping members being releasable.

2. In combination with a duct, an off-balanced gravity acting damper pivoted within said duct, resettable heat controlled supporting means mounted on an inner wall of the duct and being adapted to releasably support the damper therewithin in open position and means within the duct to releasably lock the damper in fallen closed position when the damper is released.

3. In combination with a duct, an off-balanced gravity acting damper pivoted within said duct, resettable heat controlled supporting means mounted on an inner wall of the duct and being adapted to releasably support the damper therewithin in open position, means within the duct to releasably lock the damper in fallen closed position when the damper is released, the said duct having an opening and closure member therefor to render the interior of the duct accessible for resetting the damper from closed to open position.

4. In combination, air conditioning apparatus associated with a duct, an off-balanced gravity acting damper pivoted within said duct, resettable heat controlled supporting means mounted on an inner wall of the duct and being adapted to releasably support the damper therewithin in open position and means within the duct to releasably lock the damper in fallen closed position when the damper is released.

5. In combination, air conditioning apparatus associated with a duct, an off-balanced gravity acting damper pivoted within said duct, resettable heat controlled supporting means mounted on an inner wall of the duct and being adapted to releasably support the damper therewithin in open position, means within the duct to releasably lock the damper in fallen closed position when the damper is released, the said duct having an opening and closure member therefor to render the interior of the duct accessible for resetting the damper from closed to open position.

6. In combination, air conditioning apparatus associated with a duct system, an off-balanced gravity acting damper pivoted within a section of the duct system, heat controlled and resettable supporting means for the damper mounted on an inner wall of the duct and supporting the damper therewithin in open position, means within the duct and associated with the damper to releasably lock the same in fallen closed position when released.

7. In combination, air conditioning apparatus associated with a duct system, an off-balanced and gravity acting damper pivoted within a section of the duct system, resettable heat controlled supporting means mounted on an inner wall of a section of the duct system supporting a damper therewithin in open position, means within the duct system and associated with the damper to releasably lock said damper in fallen closed position when the damper is released, the said duct system having an opening and closure member adjacent said damper to render the interior of the duct system accessible for resetting the damper from closed to open position.

WILLIAM WALLACE BURKE.